(12) United States Patent
Steegmann et al.

(10) Patent No.: US 9,045,110 B2
(45) Date of Patent: Jun. 2, 2015

(54) PORTABLE IDENTIFICATION TRANSMITTER FOR A PASSIVE ACCESS SYSTEM OF A MOTOR VEHICLE AND METHOD FOR THE ENERGY-SAVING OPERATION OF THE IDENTIFICATION TRANSMITTER

(71) Applicants: Bernd Steegmann, Heiligenhaus (DE); Boris Ziller, Ratingen (DE)

(72) Inventors: Bernd Steegmann, Heiligenhaus (DE); Boris Ziller, Ratingen (DE)

(73) Assignee: HUF HUELSBECK & FUERST GMBH & CO., Velbert (DE)

( * ) Notice: Subject to any disclaimer, the term of this patent is extended or adjusted under 35 U.S.C. 154(b) by 0 days.

(21) Appl. No.: 14/376,061

(22) PCT Filed: Feb. 13, 2013

(86) PCT No.: PCT/EP2013/052830
§ 371 (c)(1),
(2) Date: Jul. 31, 2014

(87) PCT Pub. No.: WO2013/120877
PCT Pub. Date: Aug. 22, 2013

(65) Prior Publication Data
US 2015/0008263 A1   Jan. 8, 2015

(30) Foreign Application Priority Data

Feb. 14, 2012 (DE) .......................... 10 2012 101 124

(51) Int. Cl.
*G06K 19/06* (2006.01)
*B60R 25/40* (2013.01)
(Continued)

(52) U.S. Cl.
CPC .............. *B60R 25/406* (2013.01); *G06F 21/30* (2013.01); *B60R 25/241* (2013.01); *G06K 19/0703* (2013.01); *G06K 19/0704* (2013.01); *G06K 19/0705* (2013.01)

(58) Field of Classification Search
CPC ... G06F 21/30; G06F 21/305; G06K 19/0703; B06R 25/241; B06R 25/406

USPC .................................. 235/382, 382.5, 492
See application file for complete search history.

(56) References Cited

U.S. PATENT DOCUMENTS 6,924,735 B2 * 8/2005 Ueda et al. ............... 340/426.28
7,327,216 B2 * 2/2008 Ghabra et al. ............... 340/5.26
(Continued)

FOREIGN PATENT DOCUMENTS

DE   10 2004 023 197 A1   12/2005
DE      601 07 512 T2     12/2005
(Continued)

OTHER PUBLICATIONS

International Preliminary Report on Patentability and Written Opinion of International Application No. PCT/EP2013/052830 dated Aug. 28, 2014 (English Translation) 8 pages.
(Continued)

*Primary Examiner* — Seung Lee
(74) *Attorney, Agent, or Firm* — Fay Sharpe LLP

(57) ABSTRACT

A portable identification transmitter for a passive access system of a motor vehicle includes an electrical buffer store which is coupled to an LF circuit assembly in order to charge the electrical buffer store via an energy draw from electromagnetic fields coupled in via LF antennas. Also included is an electronic switching device which can decouple a battery from a microcontroller of the passive access system. The microcontroller and the LF circuit assembly are coupled to the buffer store so that when the buffer store is charged beyond a specified charging level, the open electronic switching device can be activated to couple the battery to the microcomputer via the microcontroller while energy is supplied to the microcontroller from the buffer store.

11 Claims, 1 Drawing Sheet

(51) Int. Cl.
*G06F 21/30* (2013.01)
*B60R 25/24* (2013.01)
*G06K 19/07* (2006.01)

(56) References Cited

U.S. PATENT DOCUMENTS

| | | | |
|---|---|---|---|
| 7,334,726 B2 * | 2/2008 | Dulgerian et al. | 235/382 |
| 7,349,722 B2 * | 3/2008 | Witkowski et al. | 455/569.2 |
| 7,498,768 B2 * | 3/2009 | Stoschek et al. | 320/108 |
| 2002/0109582 A1 | 8/2002 | Mooney et al. | |

FOREIGN PATENT DOCUMENTS

| | | |
|---|---|---|
| DE | 10 2010 017 493 A1 | 12/2011 |
| DE | 10 2010 036 787 A | 2/2012 |
| EP | 0 808 971 A2 | 11/1997 |

OTHER PUBLICATIONS

International Search Report of International Application No. PCT/EP2013/05283 dated Apr. 24, 2013, 4 pages.

* cited by examiner

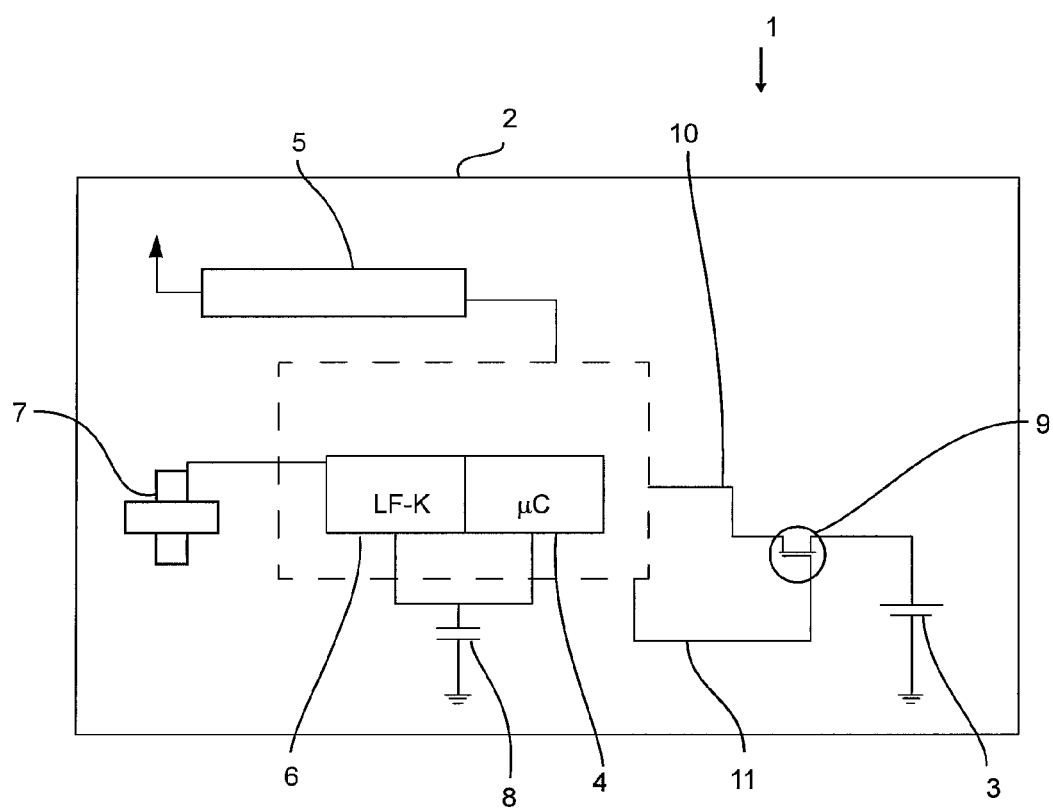

PORTABLE IDENTIFICATION TRANSMITTER FOR A PASSIVE ACCESS SYSTEM OF A MOTOR VEHICLE AND METHOD FOR THE ENERGY-SAVING OPERATION OF THE IDENTIFICATION TRANSMITTER

BACKGROUND

The invention relates to a portable identification transmitter for a passive access system of a motor vehicle, which has in a housing a supply battery, a microcontroller, HF transmitting and receiving circuits, which are controlled by the microcontroller, for communication with a vehicle-sided control unit, and an LF receiving circuit, which is coupled to the microcontroller, for receiving LF wake signals transmitted in the LF frequency range and for transmitting a wake signal to the microcontroller.

In addition, the invention relates to a method for an energy-efficient operation of such a portable identification transmitter.

Such portable identification transmitters, which are also called electronic keys or ID transponders, have the purpose of allowing an owner or user of the identification transmitter access to or the possibility of locking a motor vehicle, and the user does not actively have to press enter keys on the identification transmitter. The user only has to carry the identification transmitter (for example, in his clothes or a handbag).

These functionalities are called "passive keyless entry systems" or "keyless go systems". In contrast to conventional remote control, the "passive keyless entry functionality" requires no active actuation of the mobile identification transmitter for locking and unlocking (securing and releasing) the locking device or for unlocking the immobilizer system. For example, when actuating the door handle of the motor vehicle, communication is started between the motor vehicle and the identification transmitter and with positive identification verification (authentication) the power release of the locking device is activated. As a result, the user that carries a valid identification transmitter can open his motor vehicle without actively actuating the identification transmitter.

For example, a desired process of accessing a motor vehicle can take place as follows: the user carrying the identification transmitter approaches the driver door of the motor vehicle and reaches behind the door handle. At this moment the approach of the user or his action of reaching behind the door handle is detected by a sensor which is attached at the door (for example, by a capacitive proximity sensor mounted in the door handle) and signaled to a vehicle-sided control unit. Naturally even when a user is not authorized, i.e., when he does not carry a suitable identification transmitter, such a user would be detected and a corresponding signal would be given. An approach detection and corresponding signal would also be given when any other body approaches the sensor in a particular manner. Therefore, an access authorization has to be provided before the door is unlocked by the vehicle-sided control unit and the door handle is released for opening the door. For this purpose, an exchange of radio signals takes place which results in a dialog between the vehicle-sided control unit and a microcontroller installed in the identification transmitter. Basically, this dialog could start with an HF request signal on the part of the vehicle-sided control unit, followed up with an HF response signal emitted by the identification transmitter. However, in this case, the identification transmitter would have to contain a constantly active HF receiver. Another disadvantage of such HF communication would involve the difficulty of developing a clearly defined spatial reception range in the proximity of the motor vehicle. To ensure that the identification transmitter is activated only when it is in the predetermined spatial range (adjacent to the motor vehicle door), it is commonly practiced in prior art that the vehicle-sided control unit first of all emits via an LF transmitter with an associated transmitter coil a wake signal in the LF frequency range (for example, 125 kHz), wherein the transmitter coil is arranged (for example, in the door handle) in such a way that a predetermined dispersion range of, for example, a few meters, is created. On the other hand, the identification transmitter is provided with an associated LF receiver which has receiver coils in addition to the LF amplifier circuits.

An output of the LF receiver is coupled to an input of the microcontroller. When now the identification transmitter carried by the user and provided with an LF receiving circuit is present in the dispersion range of the LF transmitter coil of the vehicle-sided control unit when the user reaches for the door handle, the identification transmitter receives a wake signal in an LF frequency range which is immediately emitted by the vehicle-sided control unit via the transmitter coil as soon as the action of the user or his approach is detected. The LF wake signal received has the purpose of signaling the microcontroller and initiating in program-controlled manner the HF signal dialog with the vehicle-sided control unit. Therefore, the microcontroller and the HF transmitting and receiving circuits can remain changed down to low energy consumption in idle mode. However, the LF receiving circuit must remain activated (active) to be available for receiving the wake signal.

However, this constant stand-by of the LF receiving circuit results in energy consumption and thus causes the battery to discharge. Therefore, the patent application DE 10 2010 036 787.7 made the proposal to switch the LF receiving circuits off and briefly activate them only in preset intervals.

Furthermore, from EP 0808971 it is known to provide the portable transceiver with a motion switch.

However, despite those proposed measures, in conventional ID transponders a voltage source keeps discharging when not in use. Especially when after being manufactured an ID transponder is stored and not used for longer periods of time before it is delivered and coupled to a motor vehicle, it is possible that the battery is discharged to a considerable degree by the time the ID transponder is delivered. Furthermore, when activated after being manufactured such ID transponders can cause undesired interactions with the surrounding area, for example during transport or in storage.

BRIEF SUMMARY

The invention is based on the object of conserving the energy storage system of the portable identification transmitter during times when the identification transmitter is not in use, especially before it is operated for the first time.

According to the invention, this object is achieved by means of a portable identification transmitter for a passive access system of a motor vehicle showing the characteristics of claim 1. Furthermore, this object is achieved by means of a method with the characteristics of claim 8.

The invention-based identification transmitter for a passive access system of a motor vehicle has in a housing a supply battery, a microcontroller, HF transmitting and receiving circuits, which are controlled by the microcontroller, for communication with a vehicle-sided control unit, and a receiving circuit, which is coupled to the microcontroller, for receiving LF wake signals transmitted in the LF frequency range and for transmitting a wake signal to the microcontroller.

A buffer store for electric power is coupled to the LF receiving circuit. The buffer store can be charged when the LF coils are coupled to an electromagnetic field, for example, when the transponder makes a request in a request field in a motor vehicle.

The buffer store is coupled to the microcontroller, so that the microcontroller can be supplied from the buffer store for processing stored commands.

Via an electronic switch (for example, MOSFET), the supply battery is coupled to the microcontroller, optionally also to the remaining components. In its original condition, this switch is open, the supply battery is separate from the remaining system, in particular, it is not connected for supplying the microcontroller.

While activated by the microcontroller, the electronic switch can be closed when the buffer store is charged beyond a threshold value. At the same time, the threshold value is calculated in such a way that the buffer store stores enough energy to process the commands of the microcomputer for switching the switch, as well as performing the switching operation.

The electronic switch is designed and controlled in such a way that the battery remains permanently coupled with the remaining components of the system even when the charge in the buffer store and LF field is eliminated.

Consequently, according to the invention, the LF component is initially separate from the supply battery. However, when the system is coupled to an electromagnetic alternating field, for example, in the immobilizer port, the power supply is permanently activated by the supply battery, in that energy is extracted from the LF field to close under the control of the microcontroller the electronic switch for power supply.

When the switch is closed, the battery supplies the system, as well as the microcontroller and the components of HF communication, with power. In this condition, the switch remains closed between battery and microcontroller, wherein the possibly required energy is extracted from the battery.

After production, the ID transponder is in a condition in which the electronic switch separates the battery from the remaining components, so that no significant discharge takes place. In this condition, it is also not possible that the ID transponder generates any interfering electromagnetic fields, for example, during transportation or when stored in production areas.

Only when the LF circuit is signaling for the first time and in the process the buffer store is charged, the battery gets connected and the key becomes fully functional as a passive key.

Usually this battery connection takes place at the latest when the ID transducer is tuned in to the motor vehicle. Then, the ID transponder is imported into the coupling port of the motor vehicle and enough power is generated for activating the battery.

In a preferred embodiment, a MOSFET is used as electronic switch, which forms a switching path for a battery coupled between drain and source terminals and during the signaling process the gate can be controlled by the microcontroller. In an especially simple design, after the first interconnection of the MOSFET, an additional line, which is coupled to the gate of the MOSFET, is supplied from the circuit of supplied components by applying the appropriate control voltage. In this way, the MOSFET is maintained in the state of transmission by the battery position, i.e., in this condition it is self-sustaining.

However, without intermediate power the switch would return to its original condition when the battery is exchanged, with the battery de-coupled from the remaining components. Via the connection port it would have to be reactivated with the motor vehicle.

However, such a self-locking circuit can also be implemented in any manner known in prior art.

In a further embodiment of the invention, the ID transponder is designed in such a way that while battery supply is available the battery is separated by the microcontroller by activating the electronic switch when a predetermined condition is reached.

In particular, this condition can be initiated by a communication command received via HF or LF.

By means of the ID transponder a respective command set is transmitted and evaluated in the microcontroller. As a result, the battery can be decoupled to restore it to its unsupplied and discharge-protected condition, for example, after testing the ID transponder. Alternatively, time information can result in deactivating the ID transponder, for example, if it has not been used for several weeks. If, for example, a spare key is stored in the form of an ID transponder, it will be prevented from discharging. When used it only has to be inserted once in the respective port in the motor vehicle to reactivate it via the LF circuit.

Basically, it is also possible to deactivate the decoupling of power supply for safety-related incidents. For example, if compromising data communication on the HF path is detected, the key can be transferred to the passive state from which it can only be reactivated by the transponder coupling.

Advantageous and/or preferred embodiments of the invention care shown in the sub-claims.

BRIEF DESCRIPTION OF THE DRAWINGS

Subsequently, the invention is explained in more detail by means of a preferred embodiment that is shown in the drawing. It is shown:

FIG. 1 a schematic block diagram of the invention-based portable identification transmitter.

DETAILED DESCRIPTION

FIG. 1 shows a schematic representation of the invention-based portable identification transmitter 1 for a passive access system of a motor vehicle. In a housing 2 various switching components and a supply battery 3 are stored. The circuit arrangement comprises a microcontroller 4 which has the usual components, for example, a microprocessor, a non-volatile memory for programs and configuration data, a volatile memory (RAM) for data storage and various input and output interface circuits, as well as an internal bus system coupling these components. For bi-directional communication with a vehicle-sided control unit, HF transmitting and receiving circuits 5 are provided, which are connected with input/output ports of the microcontroller 4. The HF signals of the HF transmitting and receiving circuits 5 are received and emitted via an antenna. Communication between the HF transmitting and receiving circuits 5 and the vehicle-sided control unit takes place, for example, in the MHz range. FIG. 1 does not show or describe the circuits 5 in detail because they are only of sub-ordinate importance for the nature of the invention. FIG. 1 shows a diagram of an ID transponder 1. The ID transponder is displayed in the form of a diagram with its internal structure and invention-based components. Certainly, the ID transponder can have additional functional elements, for example, pushbuttons or mechanical closing systems.

The identification transmitter 1 has an LF receiving circuit, which consists of 3D receiver coils 7 and an LF coupling circuit (LF-K) 6. Such 3D coil arrays are known, for example, from DE 601 07 512 T2. Basically, such an LF coil array has orthogonal coils in different spatial directions, which are connected with a low-frequency receiver (LF receiver) (basically it is also possible to use multiple low-frequency receivers).

The LF coupling circuit is connected to input ports of the microcontroller 4. The LF coupling circuit is used for LF communication, as well as for wireless charging of the buffer store 8. In this example, the buffer store is designed in the form of a capacitor which has a suitable capacitance to be charged at the voltage provided by the LF coupling circuit to a charge that is able to operate the microcontroller. For this purpose, the LF coupling circuit has a respective charging connection which automatically applies a charging voltage to the buffer store when an LF supply field is effective.

It is known to insert or slide ID transponders into receiving units at the motor vehicle to be able to release the immobilizers system even when the energy source of the ID transponder is exhausted. In the process, by means of the LF coil array 7, energy for communication is transferred via a transponder field in the ID transponder.

It is also known to charge energy storage devices in ID transponders by means of inductive coupling. DE 10 2004 023 197 discloses such a charge of the energy storage device in an ID transponder. For example, such charge occurs only when successful security scanning of the key has been performed (see also 2002/0109582). According to the invention, the same concepts are used here to extract and store with the battery energy for the coupling process from the LF field.

When the capacitor 8 has been successfully charged, which can be verified by means of a voltage check, it provides energy for the microcontroller 4, which is part of the control unit of the ID transponder, to start the coupling process of the battery. The microcontroller 4 processes a command sequence which supplies the gate of a MOSFET 9 and in this way couples the voltage source 3, which is located in the key, for supplying the key components. As soon as this supply is achieved via the line 10 by switching the MOSFET 9, the control unit is independent from the buffer store 8 and is permanently supplied by the battery 3. In this condition of being completely supplied by the battery 3, the microcontroller can also access the HF module 5 for HF communication and perform such HF communication. As a result, the key is activated and no longer dependent on the supply by being coupled into the coil array 7 via an electromagnetic field. An appropriate circuit arrangement ensures that via the line 11 the MOSFET 9 remains conductive.

Accordingly, this ID transponder couples the battery 3 only for supplying the remaining components when first an appropriate signaling process has occurred through power supply via the coil array 7. In this way, it is possible that the ID transponder can be stored for long periods of time, even for years, without significant discharge and upon use be activated to complete function. Furthermore, through an appropriate control measure, the electronic switch 9 can be deactivated again via the control unit, in particular the microcontroller 4, for example, when the ID transponder has not been used for several weeks or months. For example, this is especially advantageous when spare keys for motor vehicles are stored without being used. By inserting the key in the respective port at the motor vehicle, the system is brought back to its activate state and coupled into the power supply.

As a result, it is important for the invention that the voltage supply of the ID transponder is revived when at times power is supplied via field coupling to the LF coils. After this signaling process, the entire system is independent of any power supply via the LF coils.

At the same time, the switch arrangement 9 can be designed in such a way that it is permanently coupled to the battery, regardless of a continuous control of the electronic switch. The reapplied deactivation and decoupling of the battery from the system is merely an advantageous development for permanently unused ID transponders.

The invention claimed is:

1. A portable identification transmitter for a passive access system of a motor vehicle, which has in a housing:
    a) a supply battery,
    b) a microcontroller,
    c) HF transmitting and receiving circuits, which are controlled by the microcontroller, for communication with a vehicle-sided control unit,
    d) and an LF circuit arrangement, which is coupled to the microcontroller, with LF antennas for coupling in electromagnetic fields in the LF frequency range,
characterized by
    e) an electric buffer store, which is coupled to the LF circuit arrangement, to charge the electric buffer store by receiving energy from electromagnetic fields coupled in via the LF antennas,
    f) an electronic switch arrangement, which can decouple the battery from the microcontroller,
wherein the microcontroller and the LF circuit arrangement are coupled with the buffer store and designed in such a way that when the buffer store is charged beyond a specific charging level, the open electronic switching device can be activated to couple the battery to the microcontroller by means of the microcontroller while energy is supplied to the microcontroller from the buffer store.

2. A portable identification transmitter according to claim 1, wherein the buffer store involves a capacitor.

3. A portable identification transmitter according to claim 1, wherein the electronic switching device has a MOSFET.

4. A portable identification transmitter according to claim 1, wherein a self-locking circuit is provided, which maintains the conductive coupling position of the electronic switching device, as soon as the microcomputer has established the interconnection between the battery and the microcomputer.

5. A portable identification transmitter according to claim 1, wherein the electronic switching device can be activated to be opened by the microcomputer and thus the battery can be decoupled from the microcomputer.

6. A portable identification transmitter according to claim 1, wherein the battery is coupled via the electronic switching device to further electronic components of the identification transmitter.

7. A portable identification transmitter according to claim 1, wherein prior to coupling the battery via the electronic switching device under the control of the microcomputer and supply from the buffer store security scanning is performed, wherein data received via the LF antennas are assessed and wherein the coupling of the battery takes place only when the security scanning has been successful.

8. A method for an energy-saving operation of a potable identification transmitter for a passive access system of a motor vehicle, wherein the identification transmitter has in a housing a supply battery, a microcontroller, HF transmitting and receiving circuits, which are controlled by the microcontroller, for communication with a vehicle-sided control unit, and an LF circuit arrangement, which is coupled to the microcontroller, for receiving LF wake signals transmitted in the LF frequency range and for transmitting a wake signal to the microcontroller with LF antennas for coupling in electromagnetic fields in the LF frequency range, comprising the steps, coupling the LF antennas to an electromagnetic field and charging an electric buffer store, which is coupled to the LF circuit arrangement by receiving energy from the electromagnetic field coupled in via the LF antennas, coupling and operating the microcontroller and the LF circuit arrangement with the buffer store in such a way that when the buffer store is charged beyond a specific charging level, the open electronic switching device can be activated to couple the battery to the microcontroller by means of the microcontroller while energy is supplied to the microcontroller from the buffer store.

9. A method according to claim 8, wherein a capacitor is used as buffer store and a MOSFET as switching device.

10. A method according to claim 8, wherein the conductive coupling position of the electronic switching device is permanently maintained, as soon as the coupling between the battery and the microcomputer has been established.

11. A method according to claim 8, wherein prior to coupling the battery via the electronic switching device security scanning is performed, wherein data received via the LF antennas are assessed and wherein the coupling of the battery takes place only when the security scanning has been successful.

* * * * *